US010032208B2

(12) United States Patent
Kawamura et al.

(10) Patent No.: US 10,032,208 B2
(45) Date of Patent: Jul. 24, 2018

(54) IDENTIFYING RECOMMENDED ELECTRONIC BOOKS WITH DETAILED COMPARISONS

(71) Applicant: International Business Machines Corporation, Armonk, NY (US)

(72) Inventors: Tateo Kawamura, Yamato (JP); Shoichiro Watanabe, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 82 days.

(21) Appl. No.: 14/969,797

(22) Filed: Dec. 15, 2015

(65) Prior Publication Data
US 2017/0169498 A1    Jun. 15, 2017

(51) Int. Cl.
G06Q 30/06    (2012.01)
(52) U.S. Cl.
CPC ..... *G06Q 30/0631* (2013.01); *G06Q 30/0625* (2013.01)
(58) Field of Classification Search
CPC .................................. G06Q 30/0631
USPC ........................................ 705/26.62
See application file for complete search history.

(56) References Cited

U.S. PATENT DOCUMENTS

| 6,085,204 | A  | * | 7/2000 | Chijiwa | G06F 15/0225 715/246 |
| 6,845,369 | B1 | * | 1/2005 | Rodenburg | G06F 17/30696 |
| 6,853,950 | B1 | * | 2/2005 | O'Reilly | G06F 17/30864 702/179 |
| 7,103,848 | B2 | * | 9/2006 | Barsness | G06F 17/30716 715/776 |

(Continued)

FOREIGN PATENT DOCUMENTS

| JP | 2014199623 A | 10/2014 |
| JP | 2014199628 A | 10/2014 |
| JP | 2015069588 A | 4/2015 |

OTHER PUBLICATIONS

Mell et al., "The NIST Definition of Cloud Computing," National Institute of Standards and Technology, Sep. 2011, p. 1-3, Special Publication 800-145.

*Primary Examiner* — Alexis Casey
(74) *Attorney, Agent, or Firm* — Reza Sarbakhsh; Robert C. Bunker

(57) ABSTRACT

A method for identifying and presenting a plurality of recommended electronic books is provided. The method may include determining and storing reading behaviors associated with electronic books. The method may further include receiving an electronic book search request. Additionally, the method may include identifying recommended electronic books based on the electronic book search request. The method may also include identifying topics associated with the plurality of recommended electronic books. The method may further include scoring the identified topics based on the reading behaviors. The method may also include determining recommendation levels for the identified recommended electronic books based on the scored topics, the reading behaviors, and the electronic book search request. The method may further include presenting detailed comparisons of the identified recommended electronic books and the scored topics based on the determined recommendation levels, the scored plurality of topics, the reading behaviors, and the electronic book search request.

18 Claims, 9 Drawing Sheets

(56) References Cited

U.S. PATENT DOCUMENTS

| | | | |
|---|---|---|---|
| 8,095,432 B1* | 1/2012 | Berman | G06Q 10/10 705/26.7 |
| 8,352,449 B1* | 1/2013 | Parekh | G06F 17/30864 707/705 |
| 8,510,247 B1* | 8/2013 | Kane, Jr. | G06N 5/02 706/46 |
| 8,554,640 B1 | 10/2013 | Dykstra et al. | |
| 8,954,444 B1* | 2/2015 | Retzlaff, II | G06F 17/30613 707/711 |
| 8,954,447 B1 | 2/2015 | Chatterjee et al. | |
| 9,031,961 B1* | 5/2015 | Cabanero | G06F 17/30386 704/200 |
| 9,153,141 B1* | 10/2015 | Kane, Jr. | G09B 7/00 |
| 2005/0130676 A1* | 6/2005 | Broussard | H04W 4/02 455/456.6 |
| 2005/0159956 A1* | 7/2005 | Rui | G06F 17/30743 704/275 |
| 2008/0079692 A1* | 4/2008 | Liang | G06F 3/016 345/156 |
| 2008/0147483 A1* | 6/2008 | Ji | G06Q 10/10 705/7.32 |
| 2008/0222552 A1* | 9/2008 | Batarseh | G06F 3/0483 715/776 |
| 2009/0077137 A1* | 3/2009 | Weda | G06F 17/30843 |
| 2009/0132520 A1* | 5/2009 | Nemeth | G06F 17/30038 |
| 2011/0196872 A1* | 8/2011 | Sims | G06F 17/30985 707/740 |
| 2011/0208722 A1* | 8/2011 | Hannuksela | G06F 17/3002 707/723 |
| 2012/0084373 A1* | 4/2012 | Chen | H04L 67/10 709/206 |
| 2012/0151351 A1* | 6/2012 | Kilroy | G06Q 30/02 715/733 |
| 2012/0210203 A1* | 8/2012 | Kandekar | G06F 17/30719 715/230 |
| 2012/0221441 A1* | 8/2012 | Patterson | G06F 17/2235 705/27.1 |
| 2012/0324392 A1* | 12/2012 | Mbenkum | G06F 17/30873 715/776 |
| 2013/0346877 A1* | 12/2013 | Borovoy | H04L 65/403 715/753 |
| 2014/0006308 A1* | 1/2014 | Baggott | G06Q 30/0201 705/347 |
| 2014/0074648 A1* | 3/2014 | Morton | G06Q 30/0631 705/26.7 |
| 2015/0050625 A1* | 2/2015 | Stein | G09B 5/02 434/169 |
| 2016/0378296 A1* | 12/2016 | Mishra | G06F 3/04815 345/633 |

* cited by examiner

IDENTIFYING RECOMMENDED ELECTRONIC BOOKS WITH DETAILED COMPARISONS

BACKGROUND

The present invention relates generally to the field of computing, and more specifically, to electronic book commerce.

Generally, users can purchase electronic versions of books using different applications and websites. Specifically, users may use devices, such as computers, tablets and smartphones that include viewing screens to read electronic books. Furthermore, users may typically locate electronic books on the different applications and websites by searching for the electronic books using keywords, names of authors, and categories/topics. Additionally, users may be provided with recommendations for electronic books based on selected topics of interests by the users, recommendations made by different users, the categories/topics associated with selected electronic books, and "customers who bought this also liked this" suggestions. For example, users may search for and select an electronic book on outer space, and based on the user selection, electronic books associated with outer space may be recommended.

SUMMARY

A method for identifying and presenting a plurality of recommended electronic books is provided. The method may include determining and storing a plurality of reading behaviors associated with a plurality of electronic books. The method may further include receiving at least one electronic book search request associated with the plurality of electronic books. Additionally, the method may include identifying the plurality of recommended electronic books based on the received at least one electronic book search request. The method may also include identifying a plurality of topics associated with the identified plurality of recommended electronic books. The method may further include scoring the identified plurality of topics based on the determined and stored plurality of reading behaviors. The method may also include determining a plurality of recommendation levels for the identified plurality of recommended electronic books based on the scored plurality of topics, the determined and stored plurality of reading behaviors, and the received at least one electronic book search request. The method may further include presenting a plurality of detailed comparisons of the identified plurality of recommended electronic books and the scored plurality of topics based on the determined plurality of recommendation levels, the scored plurality of topics, the determined and stored plurality of reading behaviors, and the at least one electronic book search request.

A computer system for identifying and presenting a plurality of recommended electronic books is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining and storing a plurality of reading behaviors associated with a plurality of electronic books. The method may further include receiving at least one electronic book search request associated with the plurality of electronic books. Additionally, the method may include identifying the plurality of recommended electronic books based on the received at least one electronic book search request. The method may also include identifying a plurality of topics associated with the identified plurality of recommended electronic books. The method may further include scoring the identified plurality of topics based on the determined and stored plurality of reading behaviors. The method may also include determining a plurality of recommendation levels for the identified plurality of recommended electronic books based on the scored plurality of topics, the determined and stored plurality of reading behaviors, and the received at least one electronic book search request. The method may further include presenting a plurality of detailed comparisons of the identified plurality of recommended electronic books and the scored plurality of topics based on the determined plurality of recommendation levels, the scored plurality of topics, the determined and stored plurality of reading behaviors, and the at least one electronic book search request.

A computer program product for identifying and presenting a plurality of recommended electronic books is provided. The computer program product may include one or more computer-readable storage devices and program instructions stored on at least one of the one or more tangible storage devices, the program instructions executable by a processor. The computer program product may include program instructions to determine and store a plurality of reading behaviors associated with a plurality of electronic books. The computer program product may also include program instructions to receive at least one electronic book search request associated with the plurality of electronic books. Additionally, the computer program product may further include program instructions to identify the plurality of recommended electronic books based on the received at least one electronic book search request. The computer program product may also include program instructions to identify a plurality of topics associated with the identified plurality of recommended electronic books. The computer program product may further include program instructions to score the identified plurality of topics based on the determined and stored plurality of reading behaviors. The computer program product may also include program instructions to determine a plurality of recommendation levels for the identified plurality of recommended electronic books based on the scored plurality of topics, the determined and stored plurality of reading behaviors, and the received at least one electronic book search request. The computer program product may further include program instructions to present a plurality of detailed comparisons of the identified plurality of recommended electronic books and the scored plurality of topics based on the determined plurality of recommendation levels, the scored plurality of topics, the determined and stored plurality of reading behaviors, and the at least one electronic book search request.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
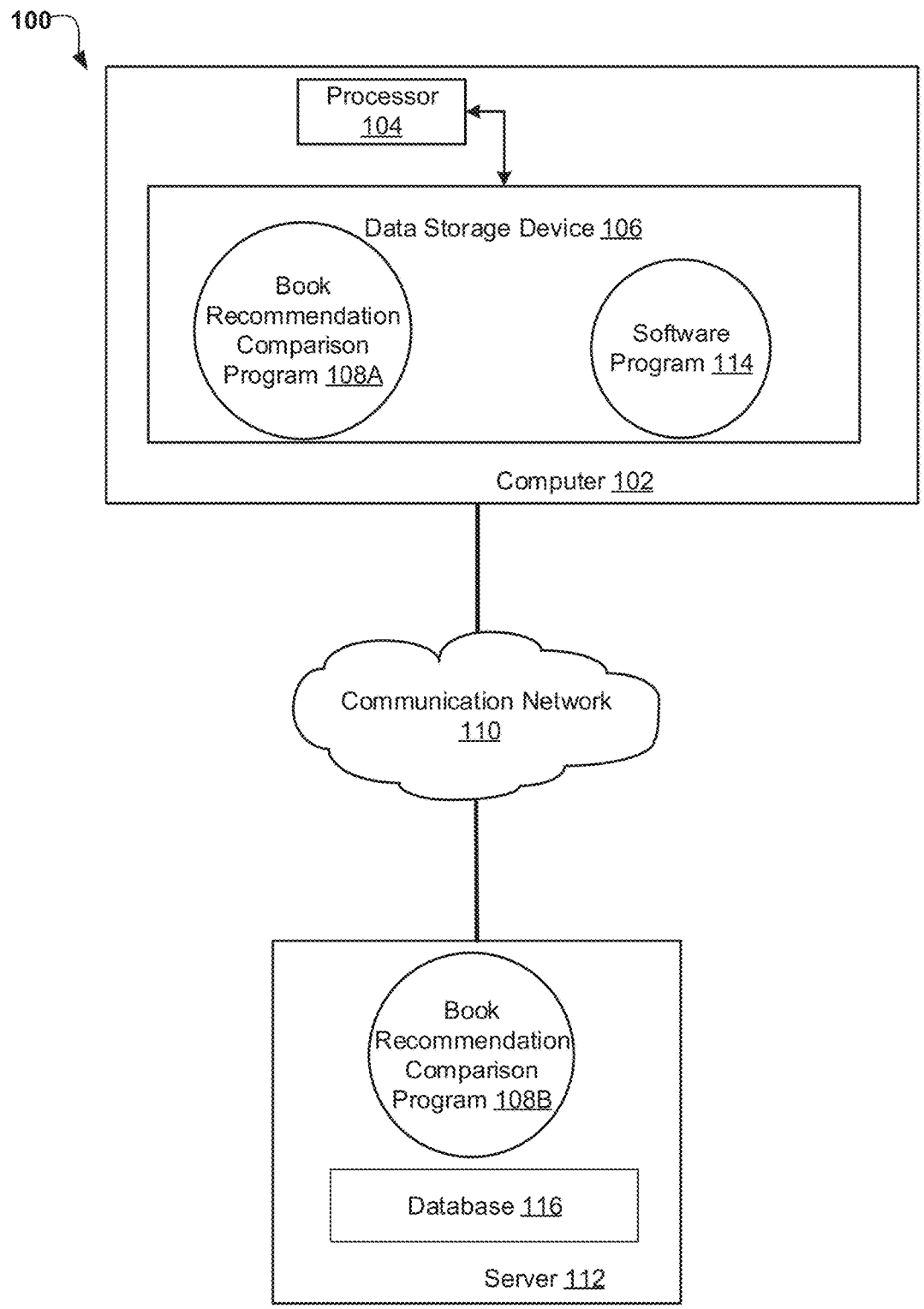
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to electronic book commerce. The following described exemplary embodiments provide a system, method and program product for identifying and presenting recommended electronic books. Therefore, the present embodiment has the capacity to improve the technical field associated with electronic book commerce by identifying reading behaviors and topics associated with electronic books, and recommending electronic books based on the identified reading behaviors and topics. Specifically, the present embodiment may receive reading behaviors associated with electronic books, identify topics associated with the electronic books based on the reading behaviors, receive electronic book search requests, and present detailed comparisons of the recommended electronic books and identified topics in response to the received search requests.

As previously described with respect to electronic book commerce, users may typically locate electronic books on different applications and websites by searching for the electronic books using keywords, names of authors, and categories/topics. Furthermore, users may be provided with recommendations for electronic books based on selected topics of interests by the users, recommendations made by different users, the categories/topics associated with selected electronic books, and "customers who bought this also liked this" suggestions. However, the identification and presentation procedures for recommending books are limited. Specifically, the recommended electronic books may be identified simply based on information such as the overall topic/category of the recommended electronic books, however, are not identified based on reading behaviors associated with the electronic books and a per topic analysis of the electronic books. Furthermore, users are not presented with indications of topics that are covered by the recommended electronic books as well as comparisons of the topics and recommended electronic books. As such, it may be advantageous, among other things, to provide a system, method and program product for identifying and presenting recommended electronic books based on detailed comparisons. Specifically, the system, method and program product may receive reading behaviors associated with electronic books, identify topics associated with the electronic books based on the reading behaviors, receive electronic book search requests, and present detailed comparisons of the recommended electronic books and identified topics in response to the received search requests.

According to at least one implementation of the present embodiment, reading behaviors associated with electronic books may be determined and stored. Next, electronic book search requests may be received. Then, recommended electronic books based on the received electronic book search requests may be identified. Next, topics associated with the identified recommended electronic books may be identified. Then, based on the determined and stored reading behaviors, scores may be determined for the identified topics associated with the identified recommended electronic books. Next, recommendation levels for the identified recommended electronic books may be determined. Then, detailed comparisons of the identified recommended electronic books and the scored topics may be presented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for identifying and presenting recommended electronic books.

According to at least one implementation, reading behaviors associated with electronic books may be determined and stored. Next, electronic book search requests may be received. Then, recommended electronic books based on the received electronic book search requests may be identified. Next, topics associated with the identified recommended electronic books may be identified. Then, based on the determined and stored reading behaviors, scores may be determined for the identified topics associated with the identified recommended electronic books. Next, recommendation levels for the identified recommended electronic books may be determined. Then, detailed comparisons of the identified recommended electronic books and the scored topics may be presented.

Referring now to FIG. 1, an exemplary networked computer environment 100 in accordance with one embodiment is depicted. The networked computer environment 100 may include a computer 102 with a processor 104 and a data storage device 106 that is enabled to run a book recommendation comparison program 108A and a software program 114. The software program 114 may be an application program such as an internet browser and an email program. The book recommendation comparison program 108A may communicate with the software program 114. The networked computer environment 100 may also include a server 112 that is enabled to run a book recommendation comparison program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 7, server computer 112 may include internal components 710a and external components 720a, respectively, and client computer 102 may include internal components 710b and external components 720b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the book recommendation comparison program 108A, 108B may interact with a database 116 that may be embedded in various storage devices, such as, but not limited to a mobile device 102, a networked server 112, or a cloud storage service.

According to the present embodiment, a program, such as a book recommendation comparison program 108A and 108B may run on the client computer 102 or on the server computer 112 via a communications network 110. The book recommendation comparison program 108A, 108B may identify, present and compare recommended electronic books. Specifically, a user using a computer, such as computer 102, may run a book recommendation comparison program 108A, 108B, that interacts with a software program 114, to receive reading behaviors associated with electronic books, identify topics associated with the electronic books based on the reading behaviors, receive electronic book search requests, and present detailed comparisons of the recommended electronic books and identified topics in response to the received search requests.

Figure 2:
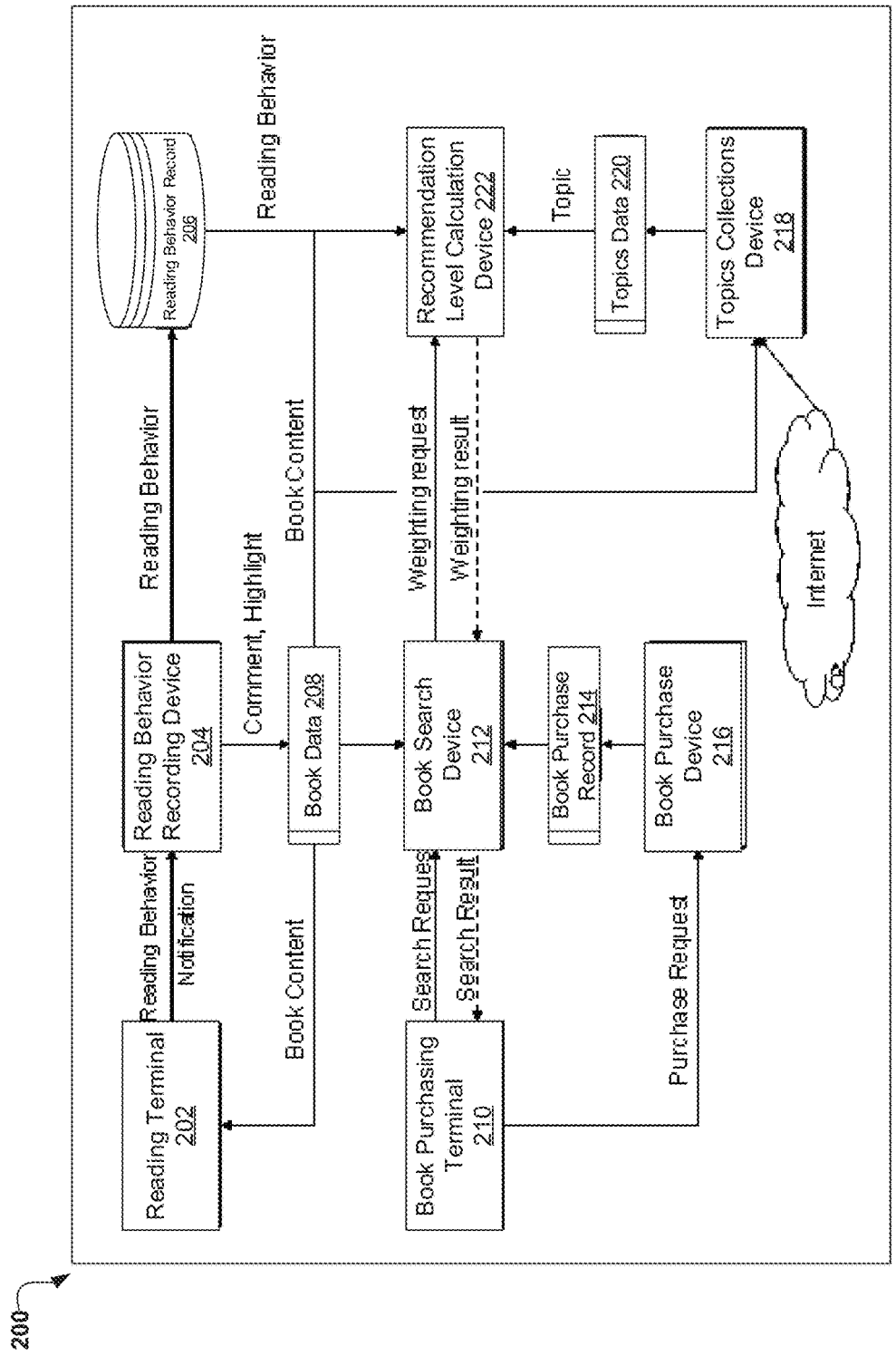
FIG. 2 is a block diagram illustrative of a system architecture of a book recommendation comparison program according to one embodiment.

Referring now to FIG. 2, a block diagram 200 illustrative of a system architecture of a book recommendation comparison program 108A, 108B (FIG. 1) is depicted. As previously described in FIG. 1, the book recommendation comparison program 108A, 108B (FIG. 1) may identify and present recommended electronic books. Specifically, via a reading terminal 202, the book recommendation comparison program 108A, 108B (FIG. 1) may determine and store user reading behaviors on a reading behavior recording device 204. For example, the book recommendation comparison program 108A, 108B (FIG. 1) may determine and store reading behaviors such as an amount of time spent on the electronic books, notifications that the electronic books have not been purchased for a specific amount of time, whether specific chapters are read and/or omitted, whether users commented on sections in the electronic books, and whether users highlighted/bookmarked sections associated with the electronic books. Thereafter, the book recommendation comparison program 108A, 108B (FIG. 1) may store the book content associated with the commented sections and bookmarked pages on a book data 208. Furthermore, the book recommendation comparison program 108A, 108B (FIG. 1) may store the reading behaviors on a reading behavior record 206.

Additionally, via a book purchasing terminal 210, the book recommendation comparison program 108A, 108B (FIG. 1) may receive electronic book search requests on a book search device 212. Furthermore, via the book purchasing terminal 210, the book recommendation comparison program 108A, 108B (FIG. 1) may receive electronic book purchasing requests on the book purchase device 216. Thereafter, the book recommendation comparison program 108A, 108B (FIG. 1) may store records of the received electronic book purchasing requests on a book purchase record 214. Next, using the book search device 212, the book recommendation comparison program 108A, 108B (FIG. 1) may identify recommended electronic books based on the received electronic book search request. Then, based on the received electronic book search request, the book recommendation comparison program 108A, 108B (FIG. 1) may use a topic collections device 218 to identify topics associated with the identified recommended electronic books.

Next, the book recommendation comparison program 108A, 108B (FIG. 1) may determine scores for the identified topics based on the reading behaviors stored on the reading behavior record 206. Thereafter, the book recommendation comparison program 108A, 108B (FIG. 1) may store the scored topics on topics data 220. Then, based on the records of the retrieved electronic book purchase requests, user reading behaviors, the received electronic book search requests, the identified topics and determined scores for the identified topics, the book recommendation comparison program 108A, 108B (FIG. 1) may determine recommendation levels for the retrieved electronic books using the recommendation level calculation device 222.

Figure 3:
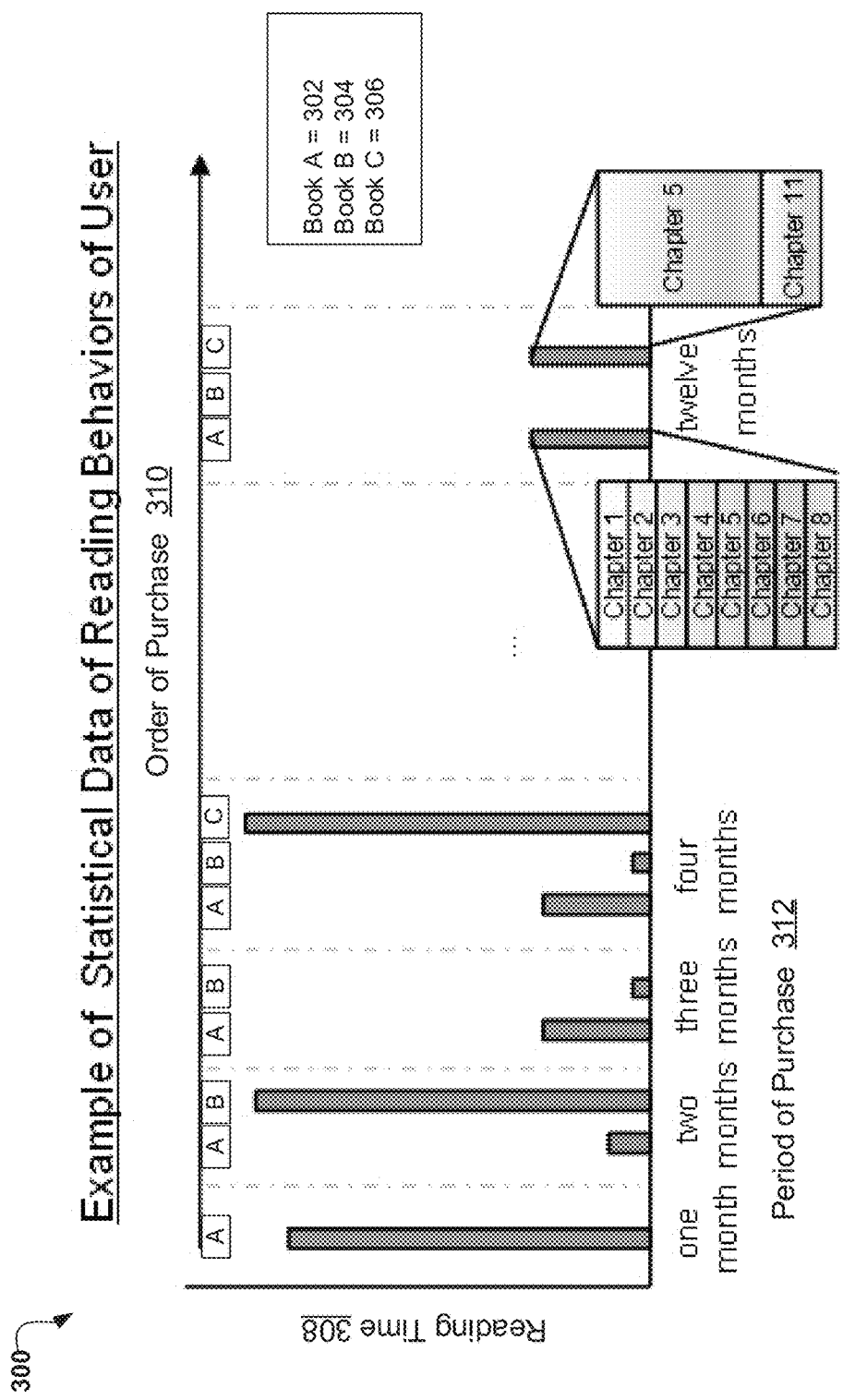
FIG. 3 is an example of statistical data based on reading behaviors by users according to one embodiment.

Referring now to FIG. 3, an example of statistical data 300 based on reading behaviors by users is depicted. As previously described in FIG. 2, the book recommendation comparison program 108A, 108B (FIG. 1) may determine and store reading behaviors on a reading behavior recording device 204 (FIG. 2). For example, the book recommendation comparison program 108A, 108B (FIG. 1) may receive and store reading behaviors such as an order of purchase 310 and a reading time 308 spent on electronic books 302, 304, 306 over a period of purchase 312. Specifically, the book recommendation comparison program 108A, 108B (FIG. 1) may determine and store that a user purchased a book A 302 on investing in month one of the period of purchase 312 and spent time 308 reading book A. Then, the book recommendation comparison program 108A, 108B (FIG. 1) may determine and store that the user purchased a book B 304 on stock markets in month two of the period of purchase 312 and spent more time 308 reading book B 304 than book A 302. Next, the book recommendation comparison program 108A, 108B (FIG. 1) may determine and store that the user spent more time 308 reading book A 302 than book B 304 in month three. Thereafter, in month four, the book recommendation comparison program 108A, 108B (FIG. 1) may determine and store that the user purchased a book C 306 on individual retirement accounts (IRA), and spent more time 308 reading book C 306 than book A 302 and book B 304. Then, in month twelve, the book recommendation comparison program 108A, 108B (FIG. 1) may determine and store that the user spent time 308 reading chapters 8 of book A 302, spent no time 308 reading book B 304, and spent time 308 reading chapters 5 and 11 of book C 306.

Figure 4:
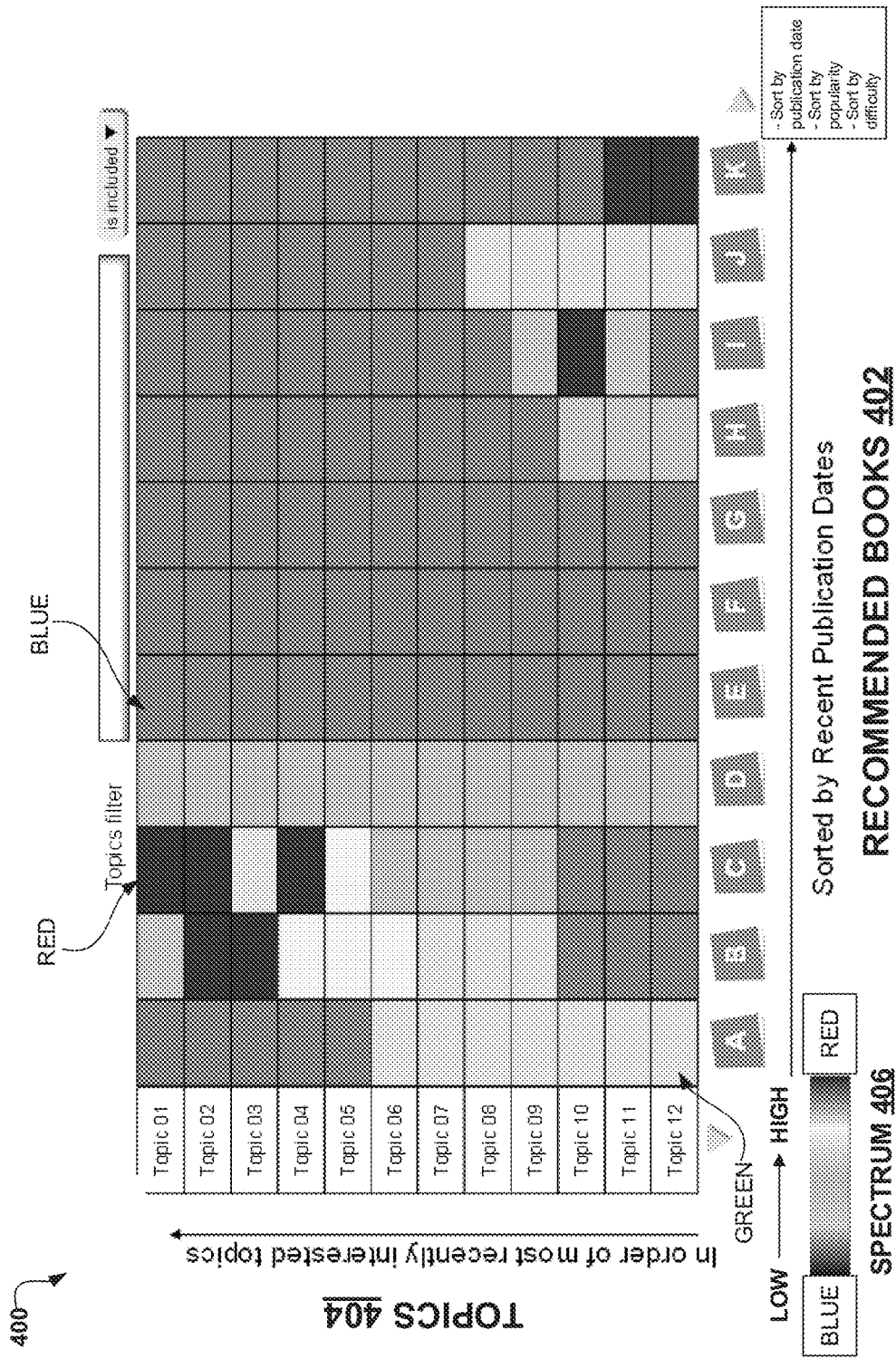
FIG. 4 is an example of a heat map of recommended electronic books and topics associated with the recommended electronic books according to one embodiment.

Referring now to FIG. 4, an example of a heat map 400 of recommended electronic books 402 and the scored topics 404 associated with the recommended electronic books 402 is depicted. As previously described in FIG. 2, the book recommendation comparison program 108A, 108B (FIG. 1) may determine scores for identified topics 404 associated with identified recommended electronic books 402 based on the reading behaviors stored on the reading behavior record 206. As such, the book recommendation comparison program 108A, 108B (FIG. 1) may present detailed comparisons of the scored topics 404 and the identified recommended electronic books 402 using a heat map 400 of the scored topics 404 associated with the recommended electronic books 402. Specifically, the book recommendation comparison program 108A, 108B (FIG. 1) may present heat maps 400 that may include a color-coded spectrum 406 to represent the scored topics 404 based on the received reading behaviors and received electronic book search requests. For example, the book recommendation comparison program 108A, 108B (FIG. 1) may receive and store users' reading behaviors associated with electronic books on investing. Thereafter, the book recommendation comparison program 108A, 108B (FIG. 1) may receive an electronic book search request from a user for electronic books on investing. Then, based on users' reading behaviors, the book recommendation comparison program 108A, 108B (FIG. 1) may identify recommended electronic books 402 associated with investing based on the received electronic book search request.

Next, the book recommendation comparison program 108A, 108B (FIG. 1) may identify topics 404 associated with the recommended electronic books 402 on investing. For example, the book recommendation comparison program 108A, 108B (FIG. 1) may identify topics 404 such as IRAs, stock investing, bond investing, mutual funds, real estate investing, and small business. Then, the book recommendation comparison program 108A, 108B (FIG. 1) may determine scores for the topics 404 associated with the recommended electronic books 402. Specifically, the book recommendation comparison program 108A, 108B (FIG. 1) may score the topics 404 to determine the popularity of the topics 404 based on users' reading behaviors. Thereafter, the book recommendation comparison program 108A, 108B (FIG. 1) may present heat maps 400 of the scored topics 404 associated with the recommended electronic books 402 and may use a color-coded spectrum 406 to represent the determined scores for the topics 404. For example, based on the determined scores, the book recommendation comparison program 108A, 108B (FIG. 1) may determine that topic 1 is popular in book C, topic 2 is popular in books B and C, topic 3 is popular in book B, and topic 4 is popular in book C, and may be represented by the color "red". Furthermore, the book recommendation comparison program 108A, 108B (FIG. 1) may determine that topics 6, 7, 8, 9, 10 and 12 are semi-popular in book A and may be represented by the color "green".

Figure 5:
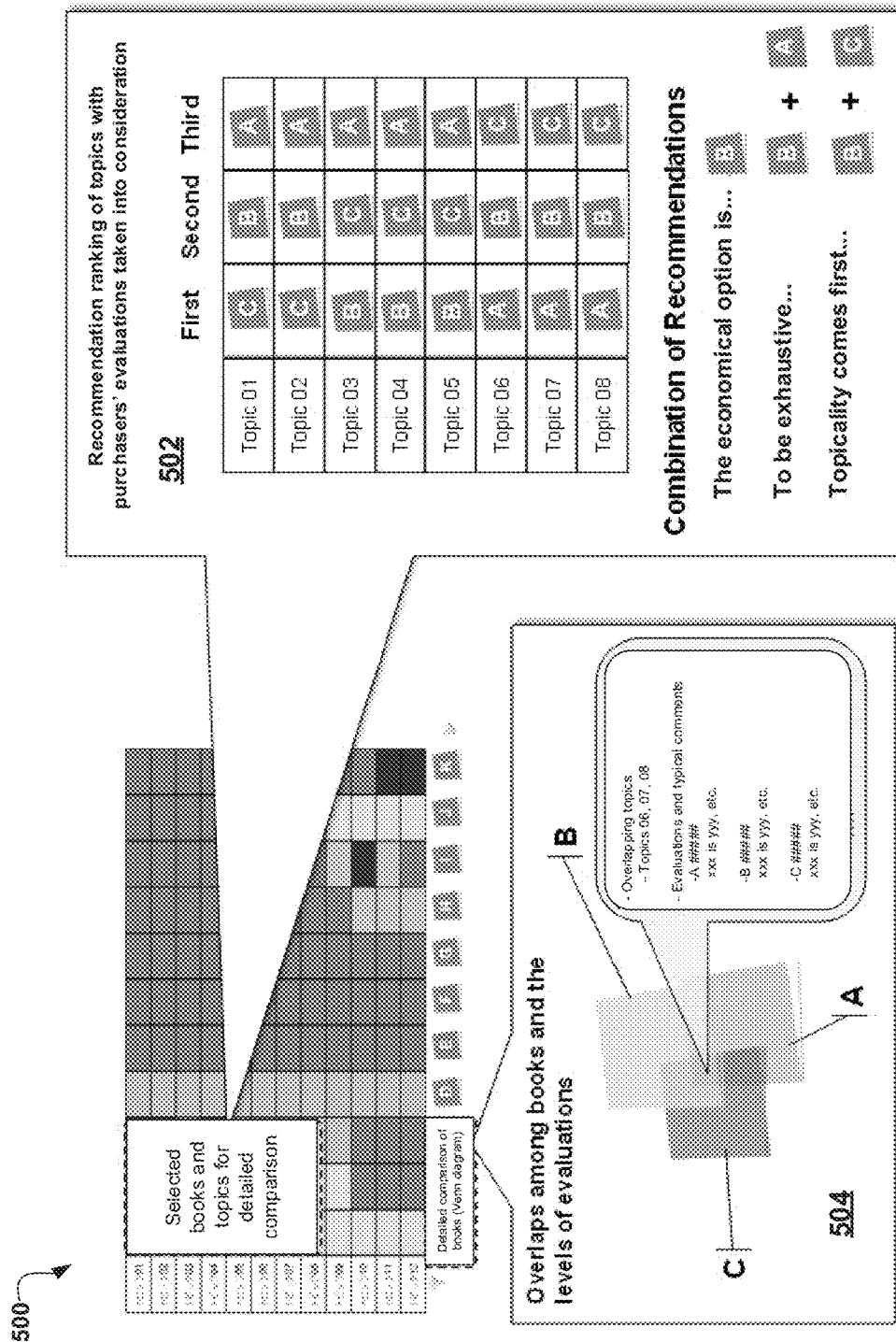
FIG. 5 is an example of detailed comparisons of the identified recommended electronic books and the scored topics according to one embodiment.

Referring now to FIG. 5, an example of detailed comparisons 500 of the identified recommended electronic books 402 (FIG. 4) and the scored topics 404 (FIG. 4) according to one embodiment is depicted. As previously described in FIG. 2, based on the records of the retrieved electronic book purchase requests, users' reading behaviors, the received electronic book search requests, the determined topics and scores for the determined topics, the book recommendation comparison program 108A, 108B (FIG. 1) may determine levels of recommendation for the identified recommended electronic books 402 (FIG. 4) using the recommendation level calculation device 222 (FIG. 2). Thereafter, the book recommendation comparison program 108A, 108B (FIG. 1) may present detailed comparisons of the identified recommended electronic books 402 (FIG. 4). Specifically, the book recommendation comparison program 108A, 108B (FIG. 1) may display ranked combinations of recommendations 502 based the identified recommended electronic books 402 (FIG. 4) and scored topics 404 (FIG. 4) as well as present Venn diagrams 504 based on the identified recommended electronic books 402 (FIG. 4) and scored topics 404 (FIG. 4).

For example, in Venn diagram 504, the book recommendation comparison program 108A, 108B (FIG. 1) may compare recommended electronic books A, B, and C 402 (FIG. 4) based on the heat map 400 (FIG. 4). Specifically, the book recommendation comparison program 108A, 108B (FIG. 1) may compare the overlapping topics 404 (FIG. 4) associated with books A, B, and C 402 (FIG. 4), as well as provide evaluations and comments based on the comparison. Furthermore, in the ranked combinations of recommendations 502, the book recommendation comparison program 108A, 108B (FIG. 1) may compare selected recommended electronic books 402 (FIG. 4) and rank selected scored topics 404 (FIG. 4), such as topics 1-8. Also, the book recommendation comparison program 108A, 108B (FIG. 1) may provide combinations of recommendations based on the comparison. For example, the book recommendation comparison program 108A, 108B (FIG. 1) may compare selected recommended electronic books A, B, and C 402 (FIG. 4), and determine that topic 1 scored higher in book C than in book B, and scored higher in book B than in book A. Additionally, in the ranked combinations of recommendations 502, the book recommendation comparison program 108A, 108B (FIG. 1) may provide a recommendation such as "the economical option is . . . book B".

Figure 6:
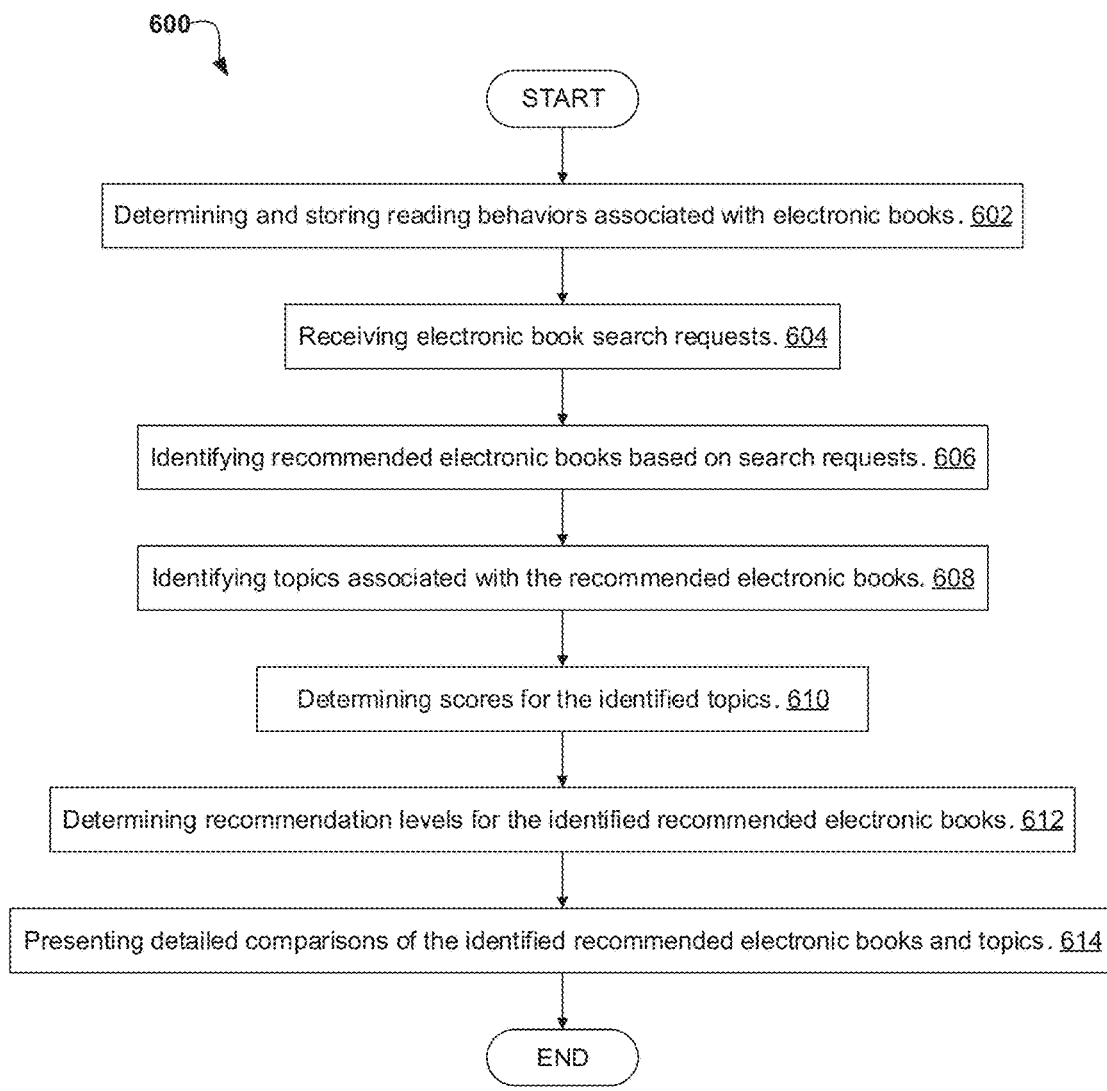
FIG. 6 is an operational flowchart illustrating the steps carried out by a program for identifying and presenting recommended electronic books according to one embodiment.

Referring now to FIG. 6, an operational flowchart 600 illustrating the steps carried out by a program for identifying and presenting recommended electronic books 402 (FIG. 4) is depicted. At 602, the book recommendation comparison program 108A, 108B (FIG. 1) may receive and store user reading behaviors. Specifically, and as previously described in FIG. 2, the book recommendation comparison program 108A, 108B (FIG. 1) may receive user reading behaviors on a reading behavior recording device 204 (FIG. 2) and store the user reading behaviors the book data 208 (FIG. 2).

For example, and as previously described in FIG. 3, the book recommendation comparison program 108A, 108B (FIG. 1) may receive and store a user reading behavior such as an amount of time 308 (FIG. 3) spent on electronic books 302, 304, and 306 (FIG. 3). Additionally, the book recommendation comparison program 108A, 108B (FIG. 1) may determine and store users' electronic book purchase history, notifications that electronic books 302, 304, and 306 (FIG. 3) are repeatedly read, notifications that electronic books 302, 304, and 306 (FIG. 3) are not repeatedly read, notifications that electronic books 302, 304, and 306 (FIG. 3) are not read after a certain amount of time following purchase of the electronic books 302, 304, and 306 (FIG. 3), notifications that electronic books 302, 304, and 306 (FIG. 3) are read without omission of pages and chapters/sections, notifications that specific chapters/sections are read, notifications that specific topics are read, notifications that electronic books 302, 304, and 306 (FIG. 3) are not read after different electronic books 302, 304, and 306 (FIG. 3) are purchased, notifications that electronic books 302, 304, and 306 (FIG. 3) are read with different electronic books 302, 304, and 306 (FIG. 3), and notifications that users made comments/bookmarks/highlights on sections in the electronic books 302, 304, and 306 (FIG. 3).

Next, at 604, the book recommendation comparison program 108A, 108B (FIG. 1) may receive electronic book search requests. Specifically, and as previously described in FIG. 2, the book recommendation comparison program 108A, 108B (FIG. 1) may receive electronic book search requests on a book search device 212 (FIG. 2). For example, and as previously described in FIG. 4, the book recommendation comparison program 108A, 108B (FIG. 1) may receive an electronic book search request for electronic books on investing.

Then, at 606, the book recommendation comparison program 108A, 108B (FIG. 1) may identify recommended electronic books 402 (FIG. 4) based on the received electronic book search request. Specifically, and as previously described in FIG. 2, using the book search device 212 (FIG. 2), and based on user reading behaviors, the book recommendation comparison program 108A, 108B (FIG. 1) may search for and retrieve recommended electronic books 402 (FIG. 4) based on the received electronic book search request. For example, and as previously described at step 604, the book recommendation comparison program 108A, 108B (FIG. 1) may receive an electronic book search request for electronic books on investing. As such, the book recommendation comparison program 108A, 108B (FIG. 1) may identify recommended electronic books 402 (FIG. 4) associated with investing based on the electronic book search request for electronic books on investing.

Next, at 608, the book recommendation comparison program 108A, 108B (FIG. 1) may identify topics 404 (FIG. 4) associated with the identified recommended electronic books 402 (FIG. 4). Specifically, and as previously described in FIG. 2, based on the received electronic book search requests, the book recommendation comparison program 108A, 108B (FIG. 1) may use a topic collections device 218 (FIG. 2) to identify topics 404 (FIG. 4) based on chapters and sections associated with the identified recommended electronic books 402 (FIG. 4). For example, the book recommendation comparison program 108A, 108B (FIG. 1) may identify recommended electronic books 402 (FIG. 4) associated with investing based on the electronic book search request for electronic books on investing. Thereafter, the book recommendation comparison program 108A, 108B (FIG. 1) may identify the topics 404 (FIG. 4) associated with the recommended electronic books 402 (FIG. 4) on investing. For example, and as previously described in FIG. 4, the book recommendation comparison program 108A, 108B (FIG. 1) may identify topics 404 (FIG. 4) such as IRAs, stock investing, bond investing, mutual funds, real estate investing, and small business.

Next, at 610, the book recommendation comparison program 108A, 108B (FIG. 1) may determine scores for the identified topics 404 (FIG. 4) associated with the identified recommended electronic books 402 (FIG. 4). Specifically, and as previously described in FIG. 2, the book recommendation comparison program 108A, 108B (FIG. 1) may compare and determine scores for the identified topics 404 (FIG. 4) based on the reading behaviors stored on the reading behavior record 206 (FIG. 2) to determine the popularity of the topics 404 (FIG. 4) based on the reading behaviors, and then store the determined scores for the identified topics 404 (FIG. 4) on topics data 220 (FIG. 2). For example, and as previously described at step 608, the book recommendation comparison program 108A, 108B (FIG. 1) may identify topics 404 (FIG. 4) such as IRAs, stock investing, bond investing, mutual funds, real estate investing, and small business. Thereafter, the book recommendation comparison program 108A, 108B (FIG. 1) may determine that IRAs and mutual funds are popular topics 404 (FIG. 4) associated with the identified recommended electronic books 402 (FIG. 4) on investing based on reading behaviors such as the reading time 308 (FIG. 3) spent on IRAs and mutual funds and that the chapters on IRAs and mutual funds are the most repeatedly read chapters. As such, the book recommendation comparison program 108A, 108B (FIG. 1) may determine high scores for the topics 404 (FIG. 4) based on IRAs and mutual funds.

Thereafter, at 612, the book recommendation comparison program 108A, 108B (FIG. 1) may determine recommendation levels for the identified recommended electronic books 402 (FIG. 4). Specifically, and as previously described in FIG. 2, based on the received and stored reading behaviors, stored electronic book purchase requests, the received electronic book search requests, the identified topics 404 (FIG. 4) and scores for the identified topics 404 (FIG. 4), the book recommendation comparison program 108A, 108B (FIG. 1) may determine recommendation levels for the identified electronic books 402 (FIG. 4) using the recommendation level calculation device 222 (FIG. 2). For example, based on the received and stored reading behaviors associated with electronic books on investing, and the scored topics 404 (FIG. 4) associated with the identified recommended electronic books 402 (FIG. 4) on investing, the book recommendation comparison program 108A, 108B (FIG. 1) may determine that the recommendation level for book B (FIG. 4) may be higher than the recommendation level for book A (FIG. 4).

Next, at 614, the book recommendation comparison program 108A, 108B (FIG. 1) may present detailed comparisons 500 (FIG. 5) of the identified recommended electronic books 402 (FIG. 4) and the scored topics 404 (FIG. 4). Specifically, and as previously described in FIGS. 4 and 5, the book recommendation comparison program 108A, 108B (FIG. 1) may present heat maps 400 (FIG. 4), ranked combinations of recommendations 502 (FIG. 5), and Venn diagrams 504 (FIG. 5) based on the identified recommended electronic books 402 (FIG. 4) and scored topics 404 (FIG. 4). For example, in heat map 400 (FIG. 4), the book recommendation comparison program 108A, 108B (FIG. 1) may use a color-coded spectrum 406 (FIG. 4) to represent the determined scores for the topics 404 (FIG. 4). Furthermore, in the ranked combinations of recommendations 502 (FIG. 5), the book recommendation comparison program 108A, 108B (FIG. 1) may compare selected books and rank selected topics, and provide combinations of recommendations based on the comparison. Additionally, in the Venn diagrams 504 (FIG. 5), the book recommendation comparison program 108A, 108B (FIG. 1) may compare the overlapping topics associated with books A, B, and C 402 (FIG. 4), as well as provide evaluations and comments based on the comparison.

It may be appreciated that FIGS. 2-6 provide only illustrations of one implementation and do not imply any limitations with regard to how different embodiments may be implemented. Many modifications to the depicted environments may be made based on design and implementation requirements.

Figure 7:
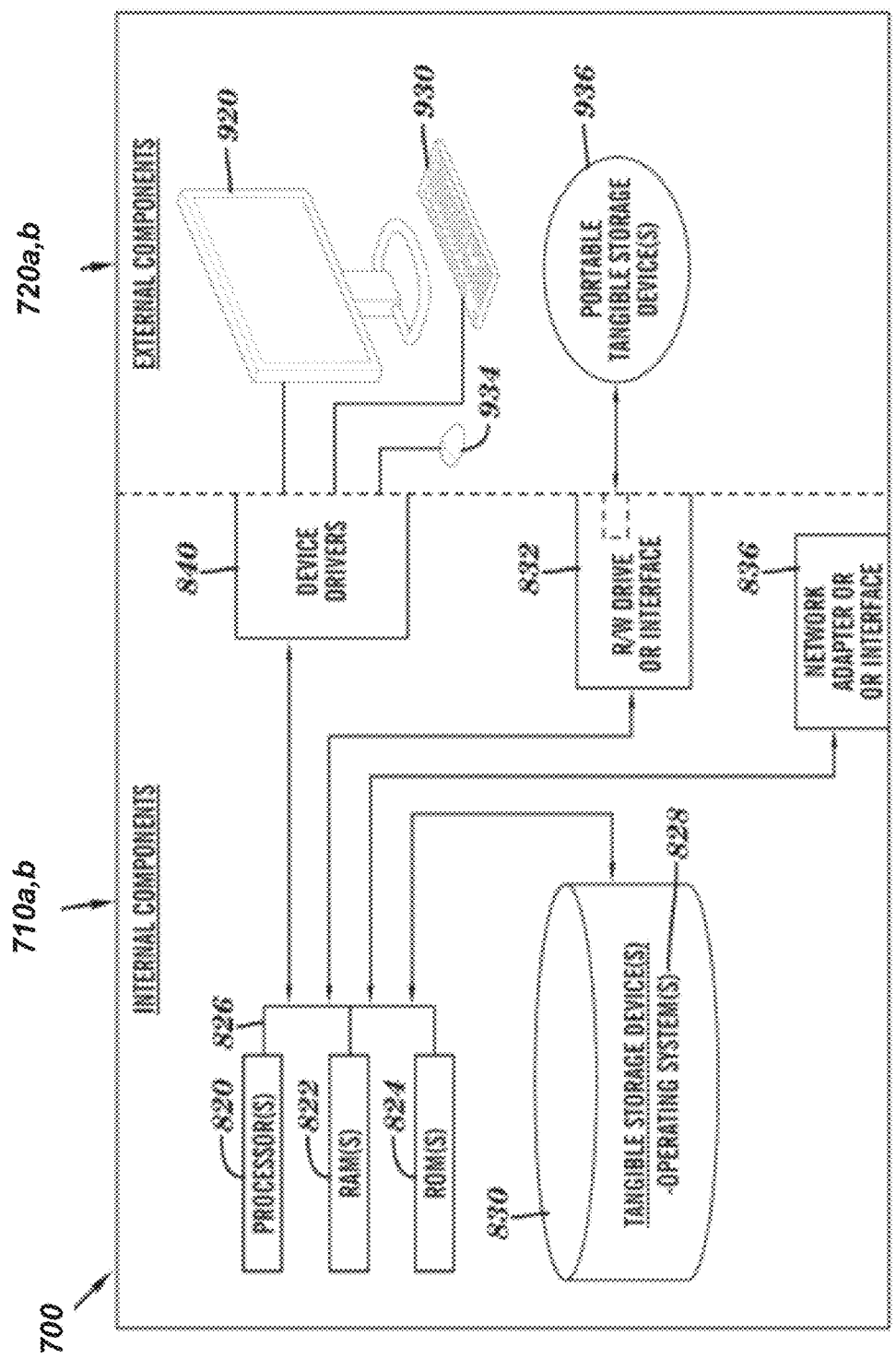
FIG. 7 is a block diagram of the system architecture of a program for identifying and presenting recommended electronic books according to one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 710, 720 is representative of any electronic device capable of executing machine-readable program instructions. Data processing system 710, 720 may be representative of a smart phone, a computer system, PDA, or other electronic devices. Examples of computing systems, environments, and/or configurations that may be represented by data processing system 710, 720 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710a, b and external components 720a, b illustrated in FIG. 7. Each of the sets of internal components 710a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the book recommendation comparison program 108A (FIG. 1) in client computer 102 (FIG. 1), and the book recommendation comparison program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 710a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a book recommendation comparison program 108A and 108B (FIG. 1), can be stored on one or more of the respective portable computer-readable tangible storage devices 936, read via the respective R/W drive or interface 832 and loaded into the respective hard drive 830.

Each set of internal components 710a, b also includes network adapters or interfaces 836 such as a TCP/IP adapter cards, wireless Wi-Fi interface cards, or 3G or 4G wireless interface cards or other wired or wireless communication links. The book recommendation comparison program 108A (FIG. 1) and software program 114 (FIG. 1) in client computer 102 (FIG. 1), and the book recommendation comparison program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the book recommendation comparison program 108A (FIG. 1) and software program 114 (FIG. 1) in client computer 102 (FIG. 1) and the book recommendation comparison program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 720a, b can include a computer display monitor 920, a keyboard 930, and a computer mouse 934. External components 720a, b can also include touch screens, virtual keyboards, touch pads, pointing devices, and other human interface devices. Each of the sets of internal components 710a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
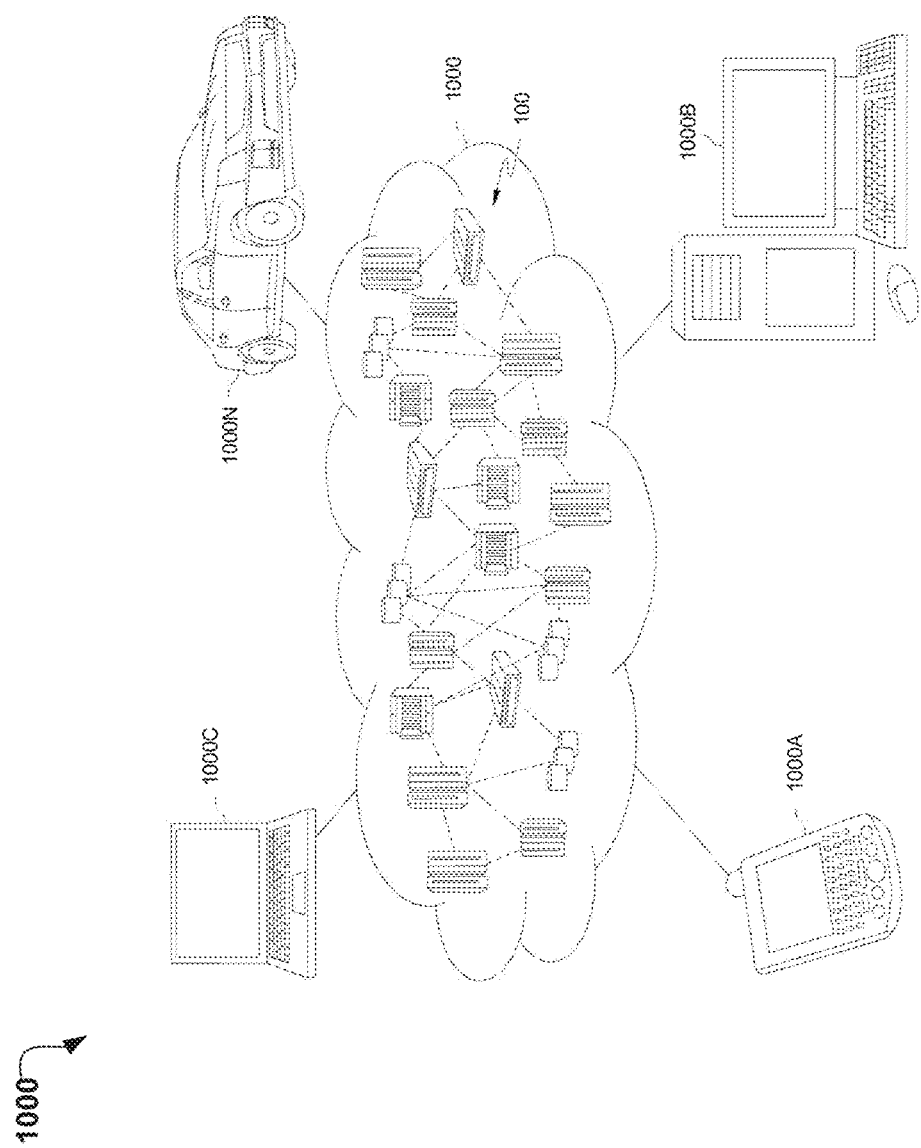
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
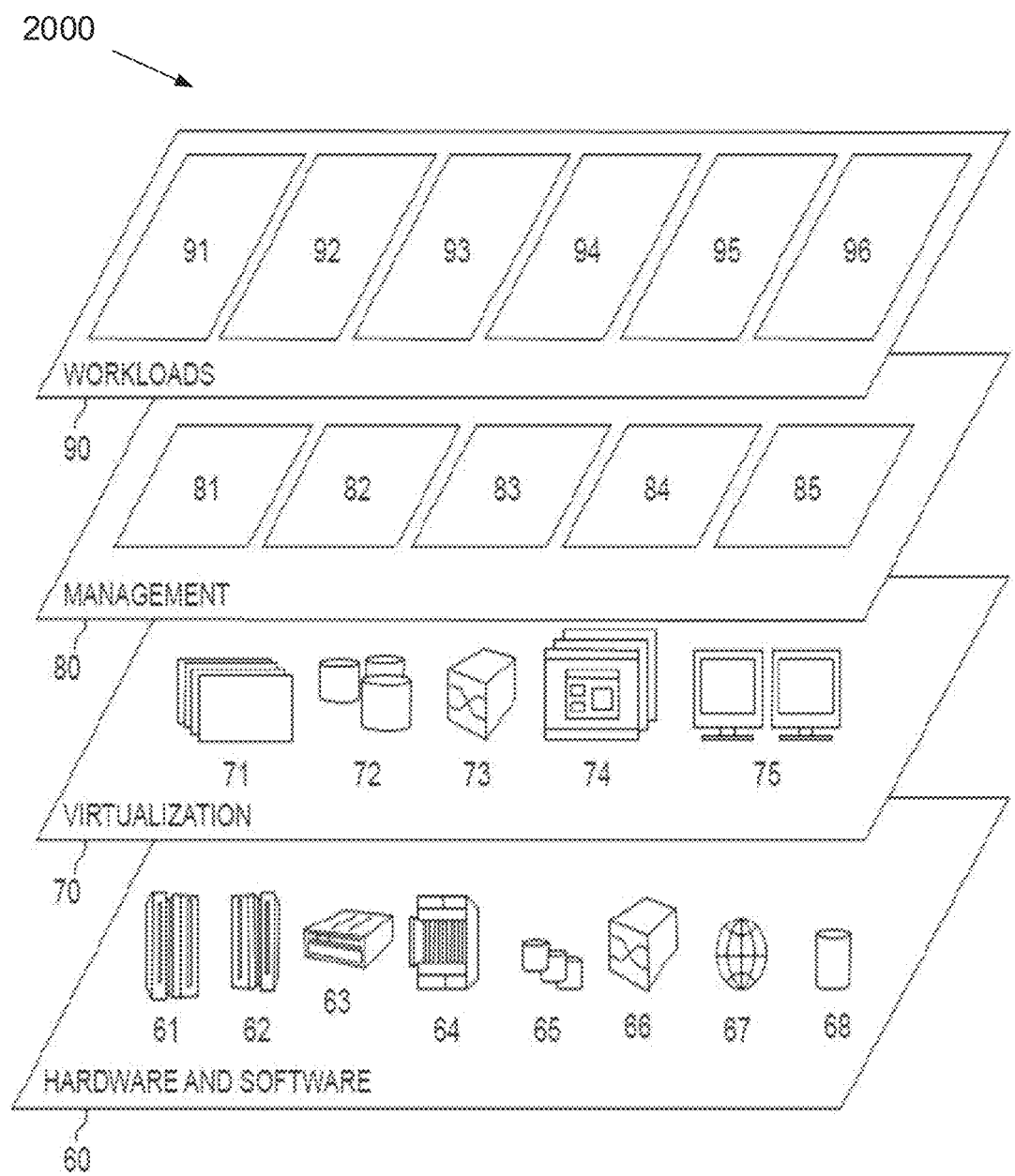
FIG. 9 is a block diagram of functional layers of the illustrative cloud computing environment of FIG. 8, in accordance with an embodiment of the present disclosure.

Referring now to FIG. 9, a set of functional abstraction layers 2000 provided by cloud computing environment 1000 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and book recommendation comparison 96. A book recommendation comparison program 108A, 108B (FIG. 1) may be offered "as a service in the cloud" (i.e., Software as a Service (SaaS)) for applications running on mobile devices 102 (FIG. 1) and may identify, present, and compare recommended electronic books and topic associated with the recommended electronic books.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying and presenting a plurality of recommendation levels for a plurality of recommended electronic books, the method comprising:
   determining and storing a plurality of reading behaviors associated with a plurality of electronic books;
   receiving at least one electronic book search request associated with the plurality of electronic books;
   identifying the plurality of recommended electronic books based on the received at least one electronic book search request;
   identifying a plurality of topics associated with the identified plurality of recommended electronic books, wherein each topic associated with the identified plurality of topics are associated with at least one chapter and at least one section of the identified plurality of recommended books;
   scoring and ranking the identified plurality of topics based on the determined and stored plurality of reading behaviors associated with the identified plurality of topics;
   determining the plurality of recommendation levels for the identified plurality of recommended electronic books based on the scored and ranked identified plurality of topics, the determined and stored plurality of reading behaviors, and the received at least one electronic book search request; and
   generating and presenting a plurality of topic comparisons and a plurality of ranked combinations of recommendations for the identified plurality of recommended electronic books, wherein generating and presenting the plurality of topic comparisons comprises comparing a plurality of overlapping topics associated with the identified plurality of recommended electronic books, and wherein generating and presenting the plurality of ranked combinations of recommendations further comprises selecting one or more combinations of the identified plurality of recommended electronic books based on the scored and ranked identified plurality of topics, and ranking the selected one or more combinations per topic.

2. The method of claim 1, wherein the plurality of reading behaviors are selected from a group comprising an electronic book purchase history, a notification that the plurality of electronic books are repeatedly read, a notification that the plurality of electronic books are not repeatedly read, a notification that the plurality of electronic books are not read after a time based on the electronic book purchase history, a notification that the plurality electronic books are read with no omission of at least one page and at least one chapter, a notification that at least one chapter and at least one section associated with the plurality of electronic books are read, a notification that at least one topic associated with the plurality of electronic books is read, a notification that the plurality of electronic books are read with at least one different electronic book, a notification comprising at least one of a comments, a bookmark, and a highlight on the plurality of electronic books.

3. The method of claim 1, wherein scoring the identified plurality of topics further comprises determining a plurality of popularity values based on the determined and stored plurality of reading behaviors.

4. The method of claim 1, wherein presenting a plurality of topic comparisons further comprises presenting at least one of a plurality of heat maps, a plurality of Venn diagrams, and a plurality of ranked combinations of recommendations.

5. The method of claim 4, wherein the plurality of heat maps further comprises a color-coded diagram to represent the scored identified plurality of topics.

6. The method of claim 4, wherein presenting the plurality of Venn diagrams further comprises comparing a plurality of overlapping topics associated with the identified plurality of recommended electronic books, and wherein presenting the plurality of ranked combinations of recommendations further comprises selecting the identified plurality of recommended electronic books and the scored identified plurality of topics, comparing the selected identified plurality of recommended electronic books and the selected scored identified plurality of topics, and providing a combination of recommendations based on the comparison.

7. A computer system for identifying and presenting a plurality of recommended electronic books, comprising:
   one or more processors, one or more non-transitory computer-readable memories, one or more non-transitory computer-readable tangible storage devices, and program instructions stored on at least one of the one or more storage devices for execution by at least one of the one or more processors via at least one of the one or more memories, wherein the computer system is capable of performing a method comprising:
   determining and storing a plurality of reading behaviors associated with a plurality of electronic books;
   receiving at least one electronic book search request associated with the plurality of electronic books;
   identifying the plurality of recommended electronic books based on the received at least one electronic book search request;
   identifying a plurality of topics associated with the identified plurality of recommended electronic books, wherein each topic associated with the identified plurality of topics are associated with at least one chapter and at least one section of the identified plurality of recommended books;
   scoring and ranking the identified plurality of topics based on the determined and stored plurality of reading behaviors associated with the identified plurality of topics;
   determining the plurality of recommendation levels for the identified plurality of recommended electronic books based on the scored and ranked identified plurality of topics, the determined and stored plurality of reading behaviors, and the received at least one electronic book search request; and
   generating and presenting a plurality of topic comparisons and a plurality of ranked combinations of recommendations for the identified plurality of recommended electronic books, wherein generating and presenting the plurality of topic comparisons comprises comparing a plurality of overlapping topics associated with the identified plurality of recommended electronic books, and wherein generating and presenting the plurality of ranked combinations of recommendations further comprises selecting one or more combinations of the identified plurality of recommended electronic books based on the scored and ranked identified plurality of topics, and ranking the selected one or more combinations per topic.

8. The computer system of claim 7, wherein the plurality of reading behaviors are selected from a group comprising an electronic book purchase history, a notification that the plurality of electronic books are repeatedly read, a notification that the plurality of electronic books are not repeatedly read, a notification that the plurality of electronic books are not read after a time based on the electronic book purchase history, a notification that the plurality electronic books are read with no omission of at least one page and at least one chapter, a notification that at least one chapter and at least one section associated with the plurality of electronic books are read, a notification that at least one topic associated with the plurality of electronic books is read, a notification that the plurality of electronic books are read with at least one different electronic book, a notification comprising at least one of a comments, a bookmark, and a highlight on the plurality of electronic books.

9. The computer system of claim 7, wherein scoring the identified plurality of topics further comprises determining a plurality of popularity values based on the determined and stored plurality of reading behaviors.

10. The computer system of claim 7, wherein presenting a plurality of topic comparisons further comprises presenting at least one of a plurality of heat maps, a plurality of Venn diagrams, and a plurality of ranked combinations of recommendations.

11. The computer system of claim 10, wherein the plurality of heat maps further comprises a color-coded diagram to represent the scored identified plurality of topics.

12. The computer system of claim 10, wherein presenting the plurality of Venn diagrams further comprises comparing a plurality of overlapping topics associated with the identified plurality of recommended electronic books, and wherein presenting the plurality of ranked combinations of recommendations further comprises selecting the identified plurality of recommended electronic books and the scored identified plurality of topics, comparing the selected identified plurality of recommended electronic books and the selected scored identified plurality of topics, and providing a combination of recommendations based on the comparison.

13. A computer program product for identifying and presenting a plurality of recommended electronic books, comprising:
one or more non-transitory computer-readable storage devices and program instructions stored on at least one of the one or more tangible storage devices, the program instructions executable by a processor, the program instructions comprising:
program instruction to determine and store a plurality of reading behaviors associated with a plurality of electronic books;
program instruction to receive at least one electronic book search request associated with the plurality of electronic books;
program instruction to identify the plurality of recommended electronic books based on the received at least one electronic book search request;
program instruction to identify a plurality of topics associated with the identified plurality of recommended electronic books, wherein each topic associated with the identified plurality of topics are associated with at least one chapter and at least one section of the identified plurality of recommended books;
program instruction to score the identified plurality of topics based on the determined and stored plurality of reading behaviors;
program instruction to determine a plurality of recommendation levels for the identified plurality of recommended electronic books based on the scored identified plurality of topics, the determined and stored plurality of reading behaviors, and the received at least one electronic book search request; and
program instruction to generate and present a plurality of topic comparisons and a plurality of ranked combinations of recommendations for the identified plurality of recommended electronic books, wherein the program instructions to generate and present the plurality of topic comparisons comprises comparing a plurality of overlapping topics associated with the identified plurality of recommended electronic books, and wherein program instructions to generate and present the plurality of ranked combinations of recommendations further comprises selecting one or more combinations of the identified plurality of recommended electronic books based on the scored and ranked identified plurality of topics, and ranking the selected one or more combinations per topic.

14. The computer program product of claim 13, wherein the plurality of reading behaviors are selected from a group comprising an electronic book purchase history, a notification that the plurality of electronic books are repeatedly read, a notification that the plurality of electronic books are not repeatedly read, a notification that the plurality of electronic books are not read after a time based on the electronic book purchase history, a notification that the plurality electronic books are read with no omission of at least one page and at least one chapter, a notification that at least one chapter and at least one section associated with the plurality of electronic books are read, a notification that at least one topic associated with the plurality of electronic books is read, a notification that the plurality of electronic books are read with at least one different electronic book, a notification comprising at least one of a comments, a bookmark, and a highlights on the plurality of electronic books.

15. The computer program product of claim 13, wherein the program instructions to score the identified plurality of topics further comprises:
program instructions to determine a plurality of popularity values based on the determined and stored plurality of reading behaviors.

16. The computer program product of claim 13, wherein the program instructions to present a plurality of topic comparisons further comprises program instructions to present at least one of a plurality of heat maps, a plurality of Venn diagrams, and a plurality of ranked combinations of recommendations.

17. The computer program product of claim 16, wherein the plurality of heat maps further comprises a color-coded diagram to represent the scored identified plurality of topics.

18. The computer program product of claim 16, wherein the program instructions to present the plurality of Venn diagrams further comprises program instructions to compare a plurality of overlapping topics associated with the identified plurality of recommended electronic books, and wherein the program instructions to present the plurality of ranked combinations of recommendations further comprises program instruction to select the identified plurality of recommended electronic books and select the scored identified plurality of topics, compare the selected identified plurality of recommended electronic books and the selected scored identified plurality of topics, and provide a combination of recommendations based on the comparison.

* * * * *